(12) United States Patent
Jennings et al.

(10) Patent No.: US 11,162,593 B1
(45) Date of Patent: Nov. 2, 2021

(54) SYSTEM AND METHOD FOR EXHAUSTING STORED ENERGY FROM A PNEUMATIC SUBSYSTEM OF A RAILCAR

(71) Applicant: Lexair, Inc., Lexington, KY (US)

(72) Inventors: John Wayne Jennings, Versailles, KY (US); Theodore Patrick O'Canna, Versailles, KY (US); Scott Gordon Brady, Lexington, KY (US)

(73) Assignee: Lexair, Inc., Lexington, KY (US)

( * ) Notice: Subject to any disclaimer, the term of this patent is extended or adjusted under 35 U.S.C. 154(b) by 0 days.

(21) Appl. No.: 16/878,981

(22) Filed: May 20, 2020

Related U.S. Application Data

(60) Provisional application No. 62/850,908, filed on May 21, 2019.

(51) Int. Cl.
| | |
|---|---|
| *F16K 3/314* | (2006.01) |
| *F15B 20/00* | (2006.01) |
| *F16K 3/02* | (2006.01) |
| *F16K 35/10* | (2006.01) |
| *F16K 17/04* | (2006.01) |
| *F16K 31/60* | (2006.01) |

(52) U.S. Cl.
CPC ............ *F16K 3/314* (2013.01); *F15B 20/007* (2013.01); *F16K 3/0209* (2013.01); *F16K 17/0406* (2013.01); *F16K 35/10* (2013.01); *F16K 3/0254* (2013.01); *F16K 31/60* (2013.01)

(58) Field of Classification Search
CPC .... F16K 3/314; F16K 3/0209; F16K 17/0406; F16K 35/10; F15B 20/007; Y10T 137/615
See application file for complete search history.

(56) References Cited

U.S. PATENT DOCUMENTS

| 4,098,303 A | * | 7/1978 | Gammell | B67D 7/0476 |
| | | | | 141/192 |
| 4,407,202 A | * | 10/1983 | McCormick | B61D 9/02 |
| | | | | 105/271 |
| 7,093,544 B1 | | 8/2006 | Allen et al. | |
| 7,328,661 B1 | | 2/2008 | Allen et al. | |
| (Continued) | | | | |

OTHER PUBLICATIONS

Lexair, Inc., Service and Operation Bulletin, Lexair, Inc. Original Series, Rail Car Valves, 4115-6XX Solenoid Operated Models, Feb. 2012.

(Continued)

*Primary Examiner* — Kevin R Barss
(74) *Attorney, Agent, or Firm* — Stites & Harbison, PLLC; David W. Nagle, Jr.

(57) ABSTRACT

A system for exhausting hazardous stored energy from a pneumatic subsystem of a railcar, comprises: an air supply for delivering air to the pneumatic subsystem of the railcar; and an isolation valve interposed between the air supply and the pneumatic subsystem of the railcar. When the isolation valve is in a normal operating position, a supply port and a delivery port of the isolation valve are in fluid communication with one another, but when the sliding shoe is in the second position, the sliding shoe effectively closes access to the supply port, and the delivery port is in fluid communication with an exhaust port of the isolation valve. The isolation valve further includes a means for locking the sliding shoe in the second position.

18 Claims, 13 Drawing Sheets

(56) References Cited

U.S. PATENT DOCUMENTS

| | | |
|---|---|---|
| 8,038,231 B1 | 10/2011 | O'Canna |
| 8,256,850 B1 | 9/2012 | O'Canna |
| 8,646,478 B2 * | 2/2014 | Nunez .................... F16K 1/443 |
| | | 137/347 |

OTHER PUBLICATIONS

Lexair, Inc., Service and Operation Bulletin, Lexair, Inc. Second Generation, Rail Car Valves Series 4415-6XX and 4415-6XXHP, Feb. 2015.
Lexair, Inc., 3/4 NPT 4-Way "S" Valve, Solenoid Operating w/Conduit Box (CAD Drawing), Sep. 2004.
Lexair, Inc., Valve Assy, S-Type, Generation II with Test Port (CAD Drawing), Aug. 2007.
Lexair, Inc., Pneumatic Directional Control Valve (Advertisement), Aug. 2006.
Lexair, Inc., Second Generation Pneumatic Directional Control Valve (Advertisement), May 2007.
Ross Operating Valve Company, Product Information, Lockout Valves, L-O-X® 15 Series, Apr. 2019.

\* cited by examiner

SYSTEM AND METHOD FOR EXHAUSTING STORED ENERGY FROM A PNEUMATIC SUBSYSTEM OF A RAILCAR

CROSS-REFERENCE TO RELATED APPLICATIONS

The present application claims priority to U.S. Patent Application Ser. No. 62/850,908 filed on May 21, 2019, the entire disclosure of which is incorporated herein by reference.

BACKGROUND OF THE INVENTION

Railcars, specialized dump trucks, and similar vehicles are used to transport large amounts of raw materials (for example, coal) from one place to another. Some of these vehicles are constructed with pneumatic or hydraulic subsystems that actuate mechanical doors to facilitate or automate unloading of the vehicle at unloading facilities.

For instance, a bottom dump railcar is constructed with a pneumatic subsystem, which works in conjunction with mechanical linkages to operate the bottom doors when the railcar is located over the appropriate unloading facility. Specifically, air pressure is employed to move the bottom doors between their respective open and closed positions. An air reservoir on the railcar supplies the air pressure for such opening and closing of the doors on the railcar. For further description of the construction and operation of such a pneumatic subsystem for a bottom dump railcar, reference is made to commonly assigned U.S. Pat. Nos. 7,093,544 and 7,328,661, which are both entitled "Control Device for a Railroad Car" and are incorporated herein by reference.

As a result of such a construction, there is potentially hazardous stored energy in the form of compressed air in the pneumatic subsystem. In certain circumstances (for example, during maintenance), it is necessary to dissipate the potentially hazardous stored energy from the subsystem, i.e., exhaust the air from the reservoir and related components (including a filter, control valve, cylinder, and interconnecting air lines), so that there is not sufficient pressure to allow the door actuators to inadvertently open or close the doors during maintenance.

In current constructions, a two-step procedure is ordinarily required to dissipate the potentially hazardous stored energy from the pneumatic subsystem. Specifically, an operator would first have to shut off the incoming supply valve to prevent additional supply air from entering the subsystem. The operator would then have to open a valve on the reservoir to bleed air from the reservoir and related components. This is a time-consuming procedure that cannot be completed quickly.

Furthermore, in current constructions, there is no way to apply a "lock-out, tag-out" procedure, which is an important safety procedure to ensure that the air reservoir for the pneumatic subsystem remains exhausted to the atmosphere so that it cannot retain sufficient pressure to allow the door actuators to inadvertently open or close the doors during maintenance.

SUMMARY OF THE INVENTION

The present invention is a system and method for exhausting potentially hazardous stored energy from a pneumatic subsystem of a railcar.

In an exemplary system for exhausting potentially hazardous stored energy from a pneumatic subsystem of a railcar in accordance with the present invention, air is delivered from an air supply to a railcar pneumatic subsystem, which works in conjunction with mechanical linkages (not shown) to operate the bottom doors of a railcar. In the exemplary system, an isolation valve is interposed between the air supply and the pneumatic subsystem.

An exemplary isolation valve includes a body, which defines a first internal cavity. A spool is positioned in the first internal cavity and is configured for sliding movement with respect to the body and within the first internal cavity. The body also defines a second internal cavity. A sliding shoe is positioned in the second internal cavity and configured for sliding movement with respect to the body and within the second internal cavity. Furthermore, the sliding shoe is connected to the spool, such that sliding movement of the spool within the first internal cavity causes corresponding sliding movement of the sliding shoe within the second internal cavity.

The exemplary isolation valve also defines three ports: a supply port, a delivery port, and an exhaust port. When the isolation valve is in a normal operating position (or "first position"), the supply port and the delivery port are in fluid communication with one another via a portion of the second internal cavity defined by the body. Thus, air is delivered to the pneumatic subsystem, unimpeded by the isolation valve. In other words, air is delivered into the isolation valve via the supply port and exits via the delivery port.

When the isolation valve has transitioned from the normal operating position to an exhaust position (or "second position"), the sliding shoe has moved within the second internal cavity defined by the body. In this second position, the sliding shoe effectively closes access to the supply port, i.e., air is no longer delivered to the pneumatic subsystem. At the same time, the delivery port and the exhaust port are in fluid communication with one another. Thus, air flows back from the pneumatic subsystem via the delivery port and is exhausted through the exhaust port.

In use, the sliding movement of the sliding shoe is effectuated by operator interaction with a knob that is mounted to a proximal end of the spool and extends outside of the body. In order to transition the isolation valve from the first position to the second position, the operator simply has to apply pressure to the knob, i.e., push the knob in and toward the body of the isolation valve. When the knob is pushed in and toward the body of the isolation valve, the spool moves (slides) within the first internal cavity defined by the body. At the same time, because of the mechanical connection between the spool and the sliding shoe, the sliding shoe moves (slides) within the second internal cavity defined by the body. Again, the sliding shoe effectively closes access to the supply port. At the same time, the delivery port and the exhaust port are placed into fluid communication with one another, so that air flows back from the pneumatic subsystem via the delivery port and is exhausted through the exhaust port.

As a result of the above-described construction, air can be readily and quickly exhausted from the pneumatic subsystem, so that there is not sufficient pressure to allow the door actuators to inadvertently open or close the doors during maintenance. In other words, potentially hazardous stored energy can be readily and quickly dissipated.

Furthermore, the exemplary isolation valve of the present invention is preferably configured for application of a "lock-out, tag-out" procedure to ensure that the isolation valve is not returned to the normal operating position. In other words, the isolation valve can be mechanically locked in the second position with use of a padlock, lock-out, tag-out hasp and padlock combination, or similar device.

DETAILED DESCRIPTION OF THE INVENTION

The present invention is a system and method for exhausting potentially hazardous stored energy from a pneumatic subsystem of a railcar.

Figure 1:
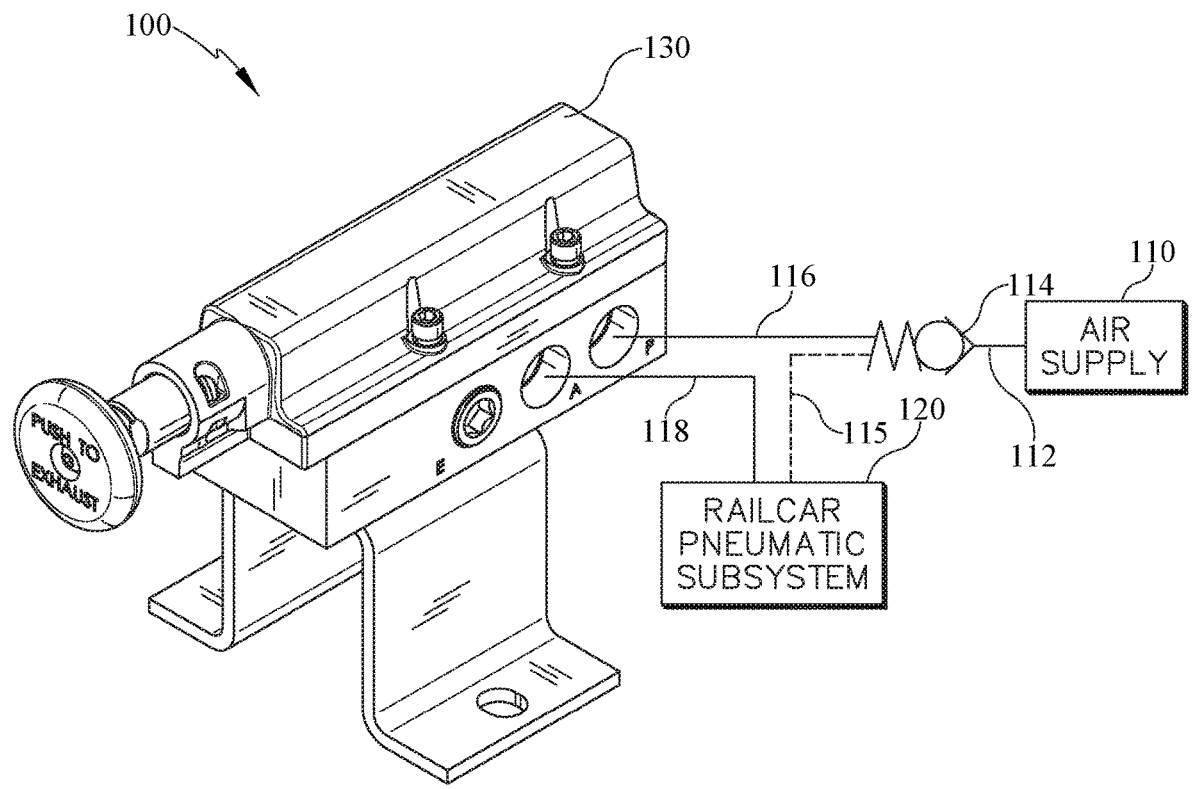
FIG. 1 is a schematic view of an exemplary system for exhausting potentially hazardous stored energy from a pneumatic subsystem of a railcar in accordance with the present invention.

FIG. 1 is a schematic view of an exemplary system 100 for exhausting potentially hazardous stored energy from a pneumatic subsystem of a railcar in accordance with the present invention. As shown in FIG. 1, air is delivered from an air supply 110 to a railcar pneumatic subsystem 120, which works in conjunction with mechanical linkages (not shown) to operate the bottom doors of a railcar. As described above, the pneumatic subsystem 120 would include a reservoir, filter, control valve, cylinder, and interconnecting air lines. As noted above, even if air supply is discontinued, air is retained in the pneumatic subsystem 120. This is intended, as retention of pressure in the reservoir of the pneumatic subsystem 120 allows the doors of the railcar to be operated even if there is a loss of supplied air.

Referring still to FIG. 1, in current constructions, air is first delivered from the air supply 110 to a check valve 114 via supply line 112. After passing though the check valve 114, air would be delivered directly to the pneumatic subsystem 120 (i.e., the reservoir) via supply line 115. However, in the exemplary system made in accordance with the present invention, an isolation valve 130 is interposed between the check valve 114 and the pneumatic subsystem 120. Thus, after passing though the check valve 114, air is delivered to the isolation valve 130 via supply line 116, which controls delivery of air to the pneumatic subsystem 120 via supply line 118.

Figure 2:
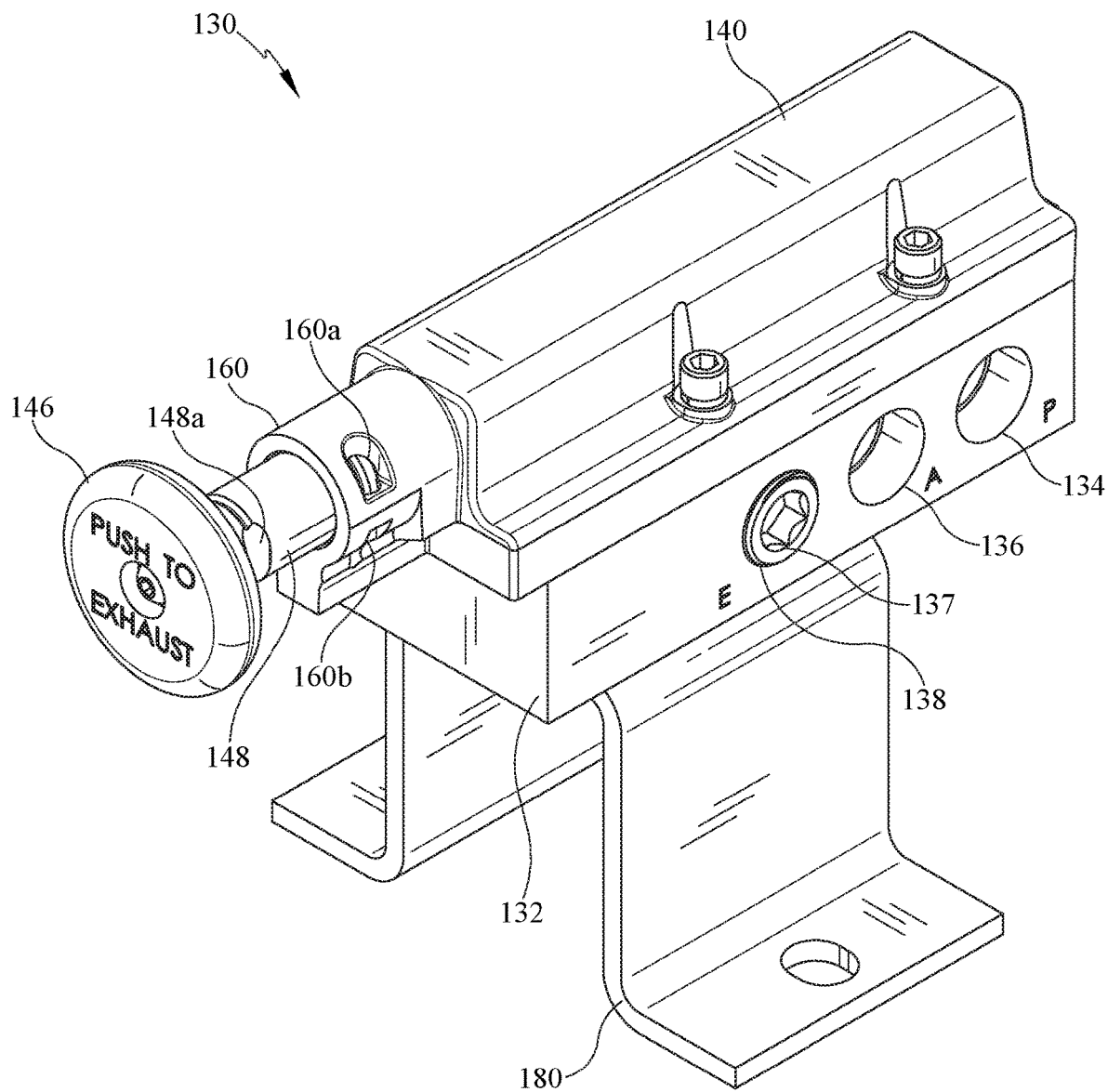
FIG. 2 is a perspective view of an exemplary isolation valve for use in a system for exhausting potentially hazardous stored energy from a pneumatic subsystem of a railcar in accordance with the present invention, in which the isolation valve is in a normal operating position.
Figure 2A:
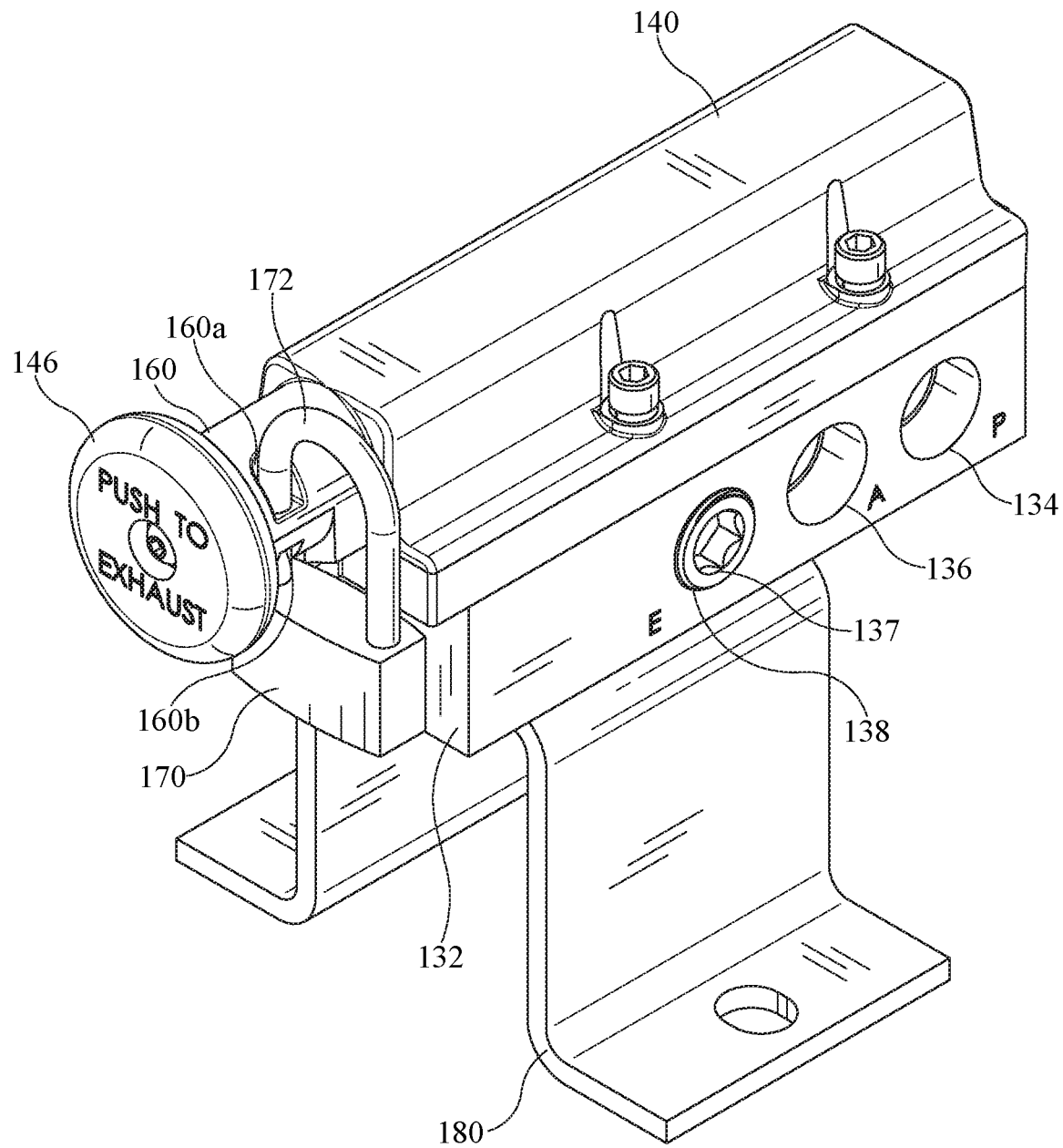
FIG. 2A is a perspective view of the exemplary isolation valve of FIG. 2, but with the isolation valve in an exhaust position.

FIG. 2 is a perspective view of an exemplary isolation valve 130, in which the isolation valve 130 is in a normal operating position. FIG. 2A is the same perspective view of the exemplary isolation valve 130, but with the isolation valve 130 in an exhaust position.

Figure 3:
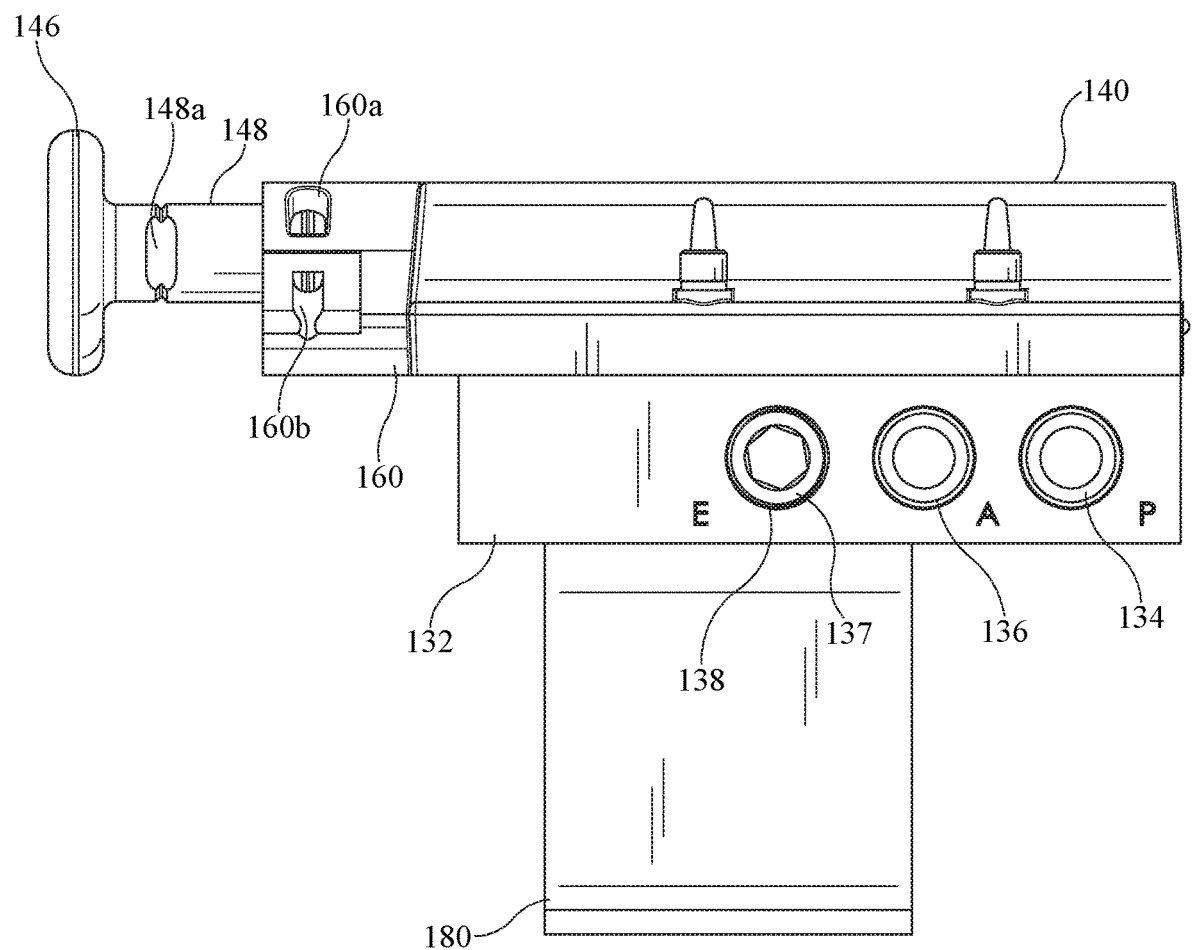
FIG. 3 is a side view of the exemplary isolation valve of FIG. 2, in which the isolation valve is in the normal operating position.
Figure 3A:
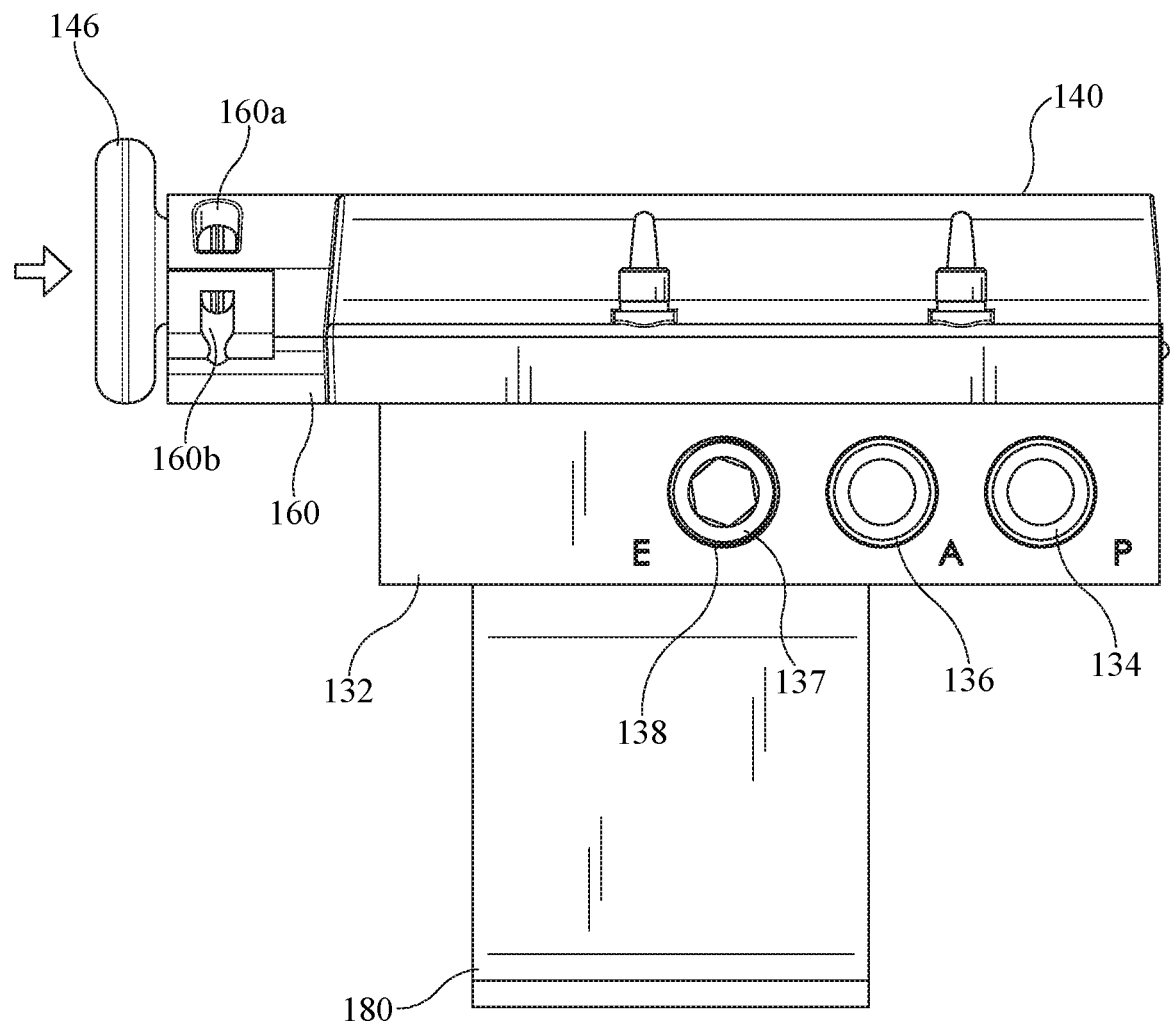
FIG. 3A is a side view of the exemplary isolation valve of FIG. 3, but with the isolation valve in the exhaust position.

FIG. 3 is a side view of the exemplary isolation valve 130, in which the isolation valve 130 is in the normal operating position. FIG. 3A is the same side view of the exemplary isolation valve 130, but with the isolation valve 130 in the exhaust position.

Figure 4:
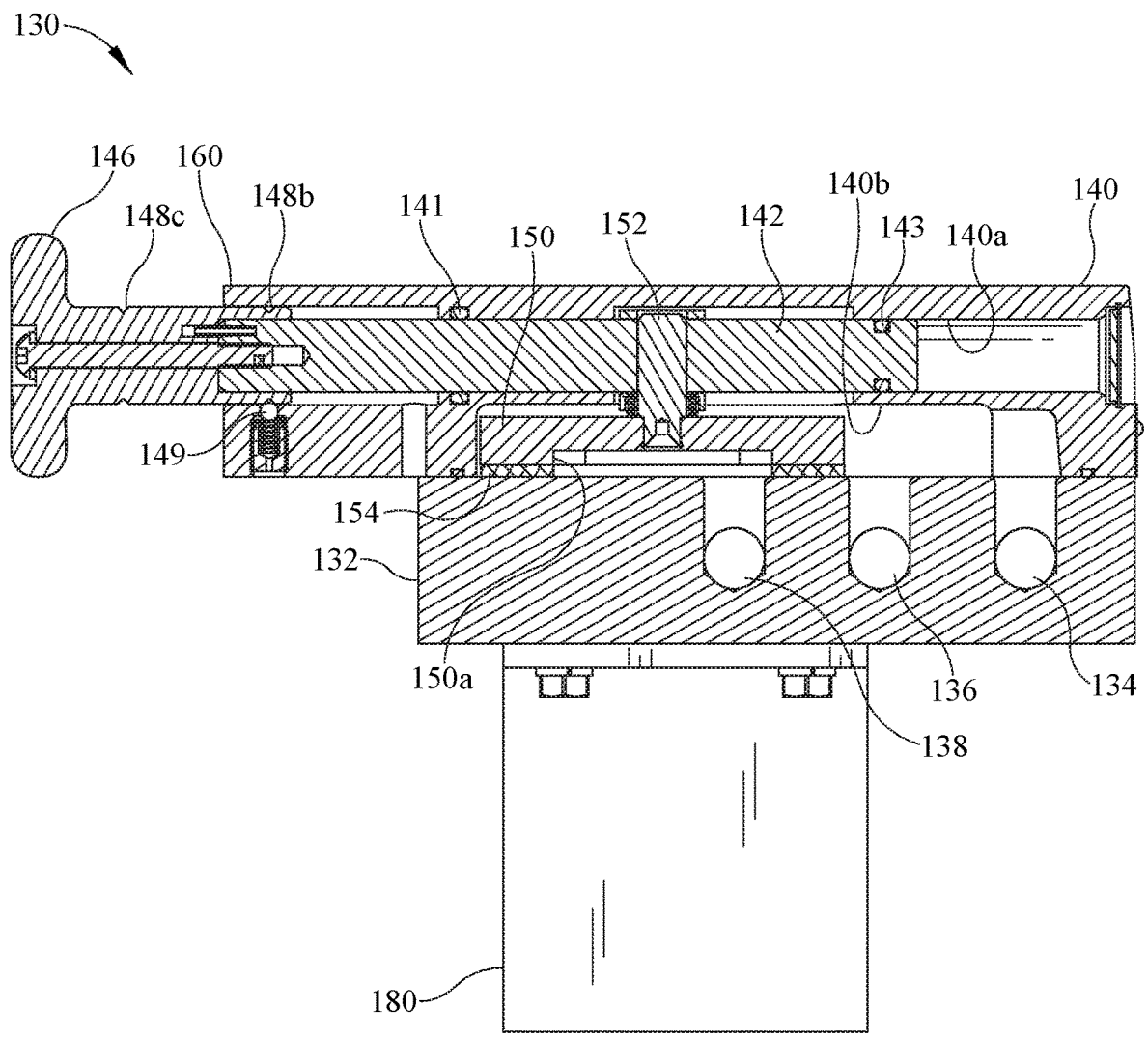
FIG. 4 is a side sectional view of the exemplary isolation valve of FIG. 2, in which the isolation valve is in the normal operating position.
Figure 4A:
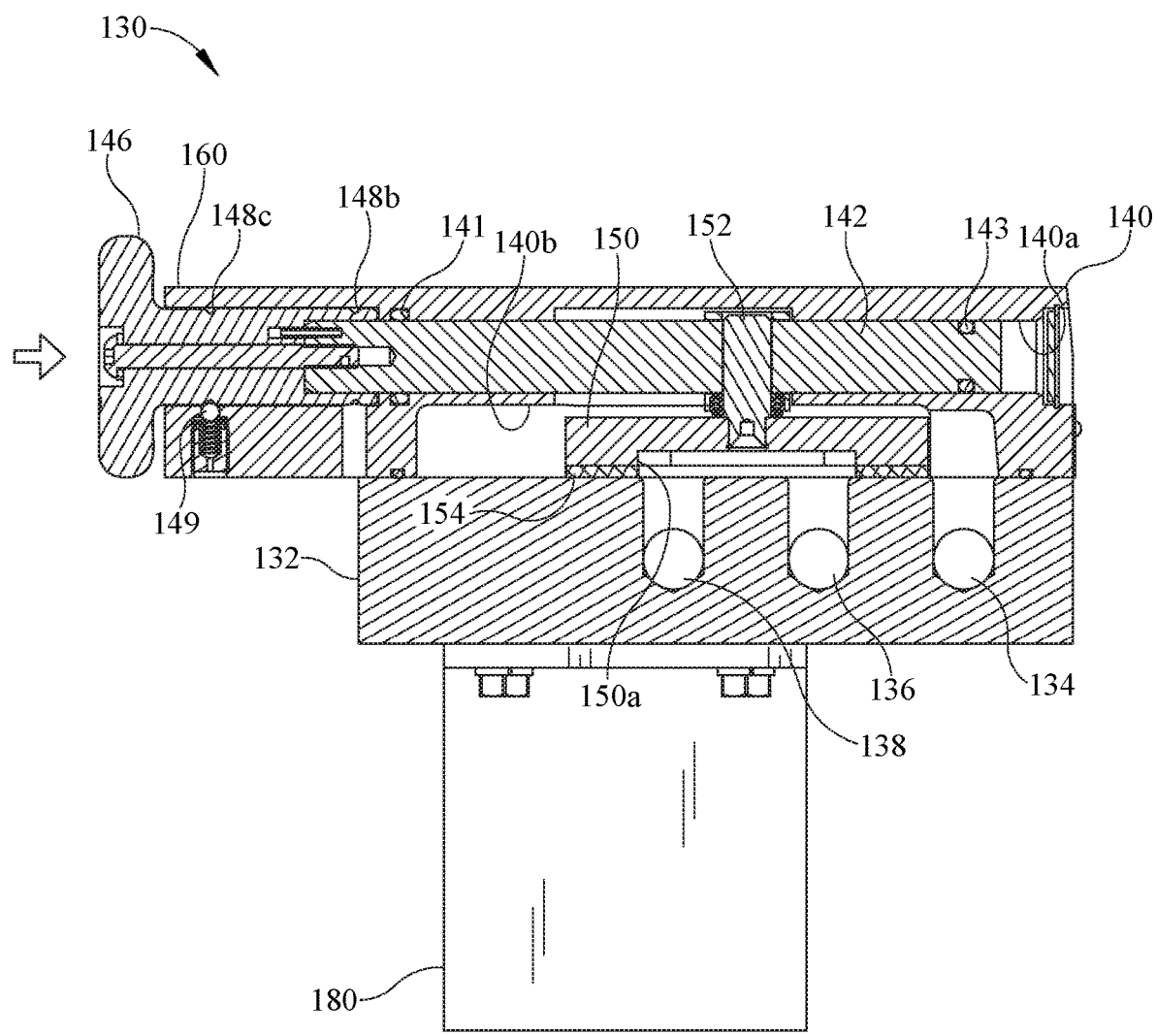
FIG. 4A is a side sectional view of the exemplary isolation valve of FIG. 4, but with the isolation valve in the exhaust position.

FIG. 4 is a side sectional view of the exemplary isolation valve 130, in which the isolation valve 130 is in the normal operating position. FIG. 4A is the same side sectional view of the exemplary isolation valve 130, but with the isolation valve 130 in the exhaust position.

As best shown in the side sectional views of FIGS. 4 and 4A, the exemplary isolation valve 130 includes a body 140, which defines a first internal cavity 140a. A spool 142 is positioned in the first internal cavity 140a and is configured for sliding movement with respect to the body 140 and within the first internal cavity 140a. To facilitate such sliding movement, in this exemplary embodiment, there is a first O-ring 141 that is mounted in a cavity and circumscribes the spool 142, and there is a second O-ring 143 that is mounted in a circumferential groove defined by the spool 142 near the distal end of the spool 142. A knob 146 is mounted to a proximal end of the spool 142 and extends outside of the body 140, the importance of which is described below.

Referring now to FIGS. 4 and 4A, the body 140 also defines a second internal cavity 140b. A sliding shoe (or "slide valve") 150 is positioned in the second internal cavity 140b and configured for sliding movement with respect to the body 140 and within the second internal cavity 140b. Furthermore, the sliding shoe 150 is connected to the spool 142, such that sliding movement of the spool 142 within the first internal cavity 140a causes corresponding sliding movement of the sliding shoe 150 within the second internal cavity 140b. In this exemplary embodiment, the sliding shoe 150 is connected to the spool 142 by a connecting pin 152.

Referring again to FIGS. 2, 2A, 3, 3A, 4, and 4A, the exemplary isolation valve 130 also includes a base 132. The base 132 defines three ports: a supply port 134, a delivery port 136, and an exhaust port 138. Each of these ports 134, 136, 138 preferably extends through and is accessible via both sides of the base 132. As shown in FIGS. 2, 2A, 3, and 3A, in this exemplary embodiment, these ports 134, 136, 138 are also labeled as supply port (P), delivery port (A), and exhaust port (E). In FIGS. 2, 2A, 3, and 3A, the supply port 134 and the delivery port 136 are open on the visible side of the base 132 and can be readily connected to lines that connect the ports 134, 136, respectively, to an air supply 110 and to a pneumatic subsystem 120 (as described above with reference to FIG. 1). In FIGS. 2, 2A, 3, and 3A, the exhaust port 138 is closed by a nut 137, but is open on the other side of the base 132.

Referring now to FIGS. 2, 3, and 4, when the isolation valve 130 is in a normal operating position (or "first position"), the supply port 134 and the delivery port 136 are in fluid communication with one another via a portion of the second internal cavity 140b defined by the body 140 (i.e., the portion of the second internal cavity 140b to the right of the sliding shoe 150 in FIG. 4). Thus, and referring again to FIG. 1, air is delivered through the check valve 112 and to the pneumatic subsystem 120, unimpeded by the isolation valve 130. In other words, air is delivered into the isolation valve 130 via the supply port 134 and exits via the delivery port 136.

Referring now to FIGS. 2A, 3A, and 4A, the isolation valve 130 has transitioned from the normal operating position to the exhaust position (or "second position"). The sliding shoe 150 has moved to the right within the second internal cavity 140b defined by the body 140. In this second position, the sliding shoe 150 effectively closes access to the supply port 134, i.e., air is no longer delivered to the pneumatic subsystem 120. At the same time, the delivery port 136 and the exhaust port 138 are in fluid communication with one another via a recess 150a defined in the lower surface of the sliding shoe 150. Thus, air flows back from the pneumatic subsystem 120 via the delivery port 136 and is exhausted through the exhaust port 138.

Figure 5:
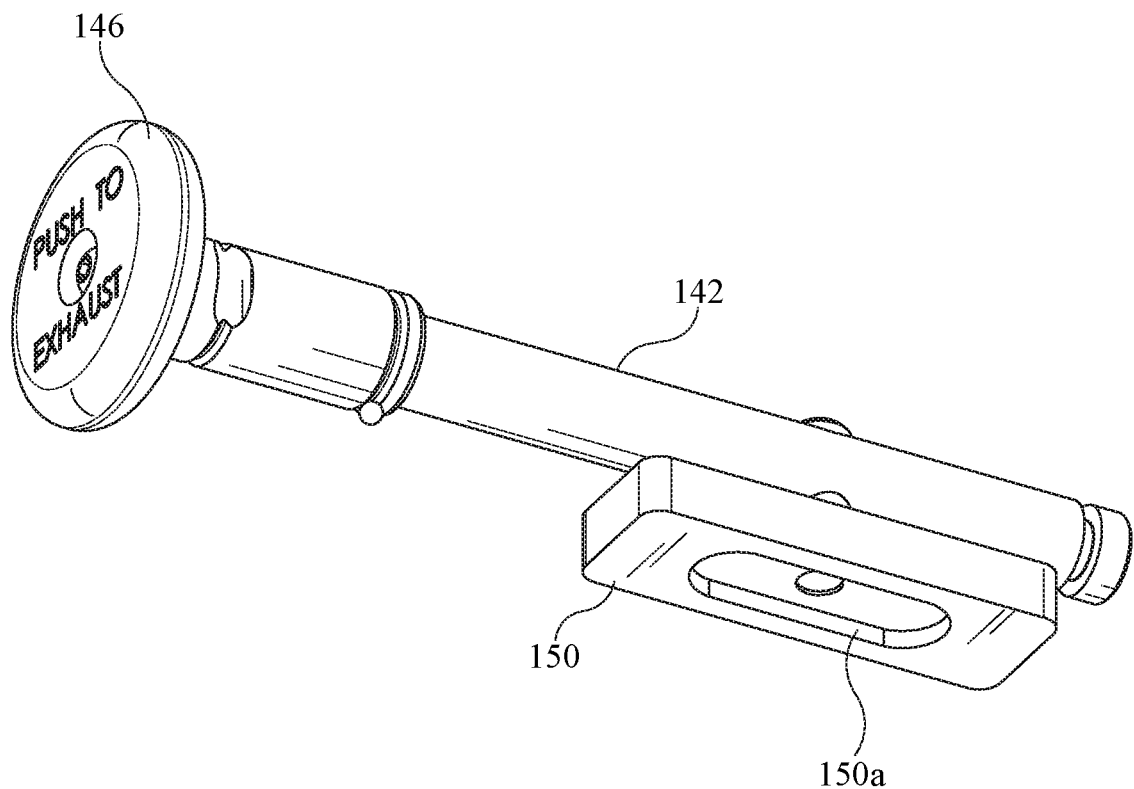
FIG. 5 is a perspective view of a subassembly of certain components of the exemplary isolation valve.

FIG. 5 is a perspective view of the subassembly of the knob 146, the spool 142, and the sliding shoe 150 of the isolation valve 130, further illustrating the construction of these components in this exemplary embodiment.

Referring again to FIGS. 2, 2A, 3, 3A, 4, and 4A, in use, the sliding movement of the sliding shoe 150 is effectuated by operator interaction with the knob 146. As described above, the knob 146 is mounted to the proximal end of the spool 142 and extends outside of the body 140. Quite simply, in order to transition the isolation valve 130 from the normal operating position (or "first position") to the exhaust position (or "second position"), the operator simply has to apply pressure to the knob 146, i.e., push the knob 146 in and toward the body 140 of the isolation valve 130. As described above, the knob 146 is mounted to the proximal end of the spool 142. Thus, when the knob 146 is pushed in and toward the body 140 of the isolation valve 130, the spool 142 moves (slides) within the first internal cavity 140a defined by the body 140. At the same time, because of the mechanical connection between the spool 142 and the sliding shoe 150, the sliding shoe 150 moves (slides) within the second internal cavity 140b defined by the body 140. Again, the sliding shoe 150 effectively closes access to the supply port 134. At the same time, the delivery port 136 and the exhaust port 138 are placed into fluid communication with one another via the recess 150a defined in the lower surface of the sliding shoe 150, so that air flows back from the pneumatic subsystem 120 via the delivery port 136 and is exhausted through the exhaust port 138.

In this exemplary embodiment, and as shown in the sectional views of FIGS. 4 and 4A, a seal 154 is positioned between the lower surface of the sliding shoe 150 and a top surface of the base 132, which circumscribes the recess 150a defined in the lower surface of the sliding shoe 150. This seal 154 prevents any air flow between the cavity defined by the recess 150a and the portion of the second internal cavity 140b that is external to the sliding shoe 150, and this seal 154 also ensures that access to the supply port 134 is closed when the sliding shoe 150 is in the second position.

As a result of the above-described construction, air can be readily and quickly exhausted from the pneumatic subsystem 120, so that there is not sufficient pressure to allow the door actuators to inadvertently open or close the doors during maintenance. In other words, potentially hazardous stored energy can be readily and quickly dissipated.

Furthermore, the exemplary isolation valve 130 of the present invention is preferably configured for application of a "lock-out, tag-out" procedure to ensure that the isolation valve 130 is not returned to the normal operating position. In other words, the isolation valve can be mechanically locked in the second position with use of a padlock, lock-out, tag-out hasp and padlock combination, or similar device.

For example, with respect to the exemplary isolation valve 130 described above with reference to FIGS. 2, 2A, 3, 3A, 4, and 4A, the isolation valve 130 includes a shroud 160 that encircles a shaft 148 of the knob 146. Aligned upper and lower holes 160a, 160b are defined through the shroud 160. Furthermore, a groove 148a is defined in an external surface of the shaft 148 of the knob 146. When the isolation valve 130 is in the exhaust position, with the knob 146 pushed in and toward the body 140 of the isolation valve 130 (i.e., at the bottom of the stroke), the groove 148a defined in the external surface of the shaft 148 of the knob 146 is aligned with the upper and lower holes 160a, 160b defined through the shroud 160. Thus, as shown in FIG. 2A, the shackle 172 of a padlock 170 or similar lockout device can be inserted into and through the upper and lower holes 160a, 160b to engage the groove 148a defined in an external surface of the shaft 148 of the knob 146 to prevent any further movement of the knob 146.

As a further refinement, in this exemplary embodiment and as shown in the sectional views of FIGS. 4 and 4A, the shaft 148 of the knob 146 includes a first circumferential groove 148b and a second circumferential groove 148c. A spring-loaded ball 149 is mounted in the shroud 160. The spring-loaded ball 149 is biased into engagement with the shaft 148 of the knob 146. When the isolation valve 130 is in the first position, as shown in FIG. 4, the spring-loaded ball 149 is seated in the first circumferential groove 148b. When the isolation valve 130 is in the second position, as shown in FIG. 4A, the spring-loaded ball 149 is seated in the second circumferential groove 148c. Such engagement of the spring-loaded ball 149 with the respective first and second circumferential grooves 148b, 148c thus defines the respective first and second positions.

Finally, as shown in FIGS. 2, 2A, 3, 3A, 4, and 4A, the isolation valve 130 may be mounted to a bracket 180, which facilitates the mounting of the isolation valve 130 to a railcar (not shown).

Again, with respect to the isolation valve 130 described above, the body 140, which defines the first internal cavity 140a and the second internal cavity 140b, is mounted on top of the base 132 (which also may be referred to as a "ported subbase"), which defines the three ports: the supply port 134, the delivery port 136, and the exhaust port 138. It should be recognized that this two-part construction facilitates service and preventative maintenance. Specifically, the body 140 can be removed from the base 132 without disturbing the plumbing connections, i.e., the lines that are connected to the supply port 134, the delivery port 136, and/or the exhaust port 138. In other words, the mechanical components (such as the spool 142 and the sliding shoe 150) of the isolation valve 130, which are in the body 140, can be readily accessed without disturbing the plumbing connections.

As a result of this two-part construction, it should also be recognized that alternate body constructions could be incorporated into the isolation valve 130.

Figure 6:
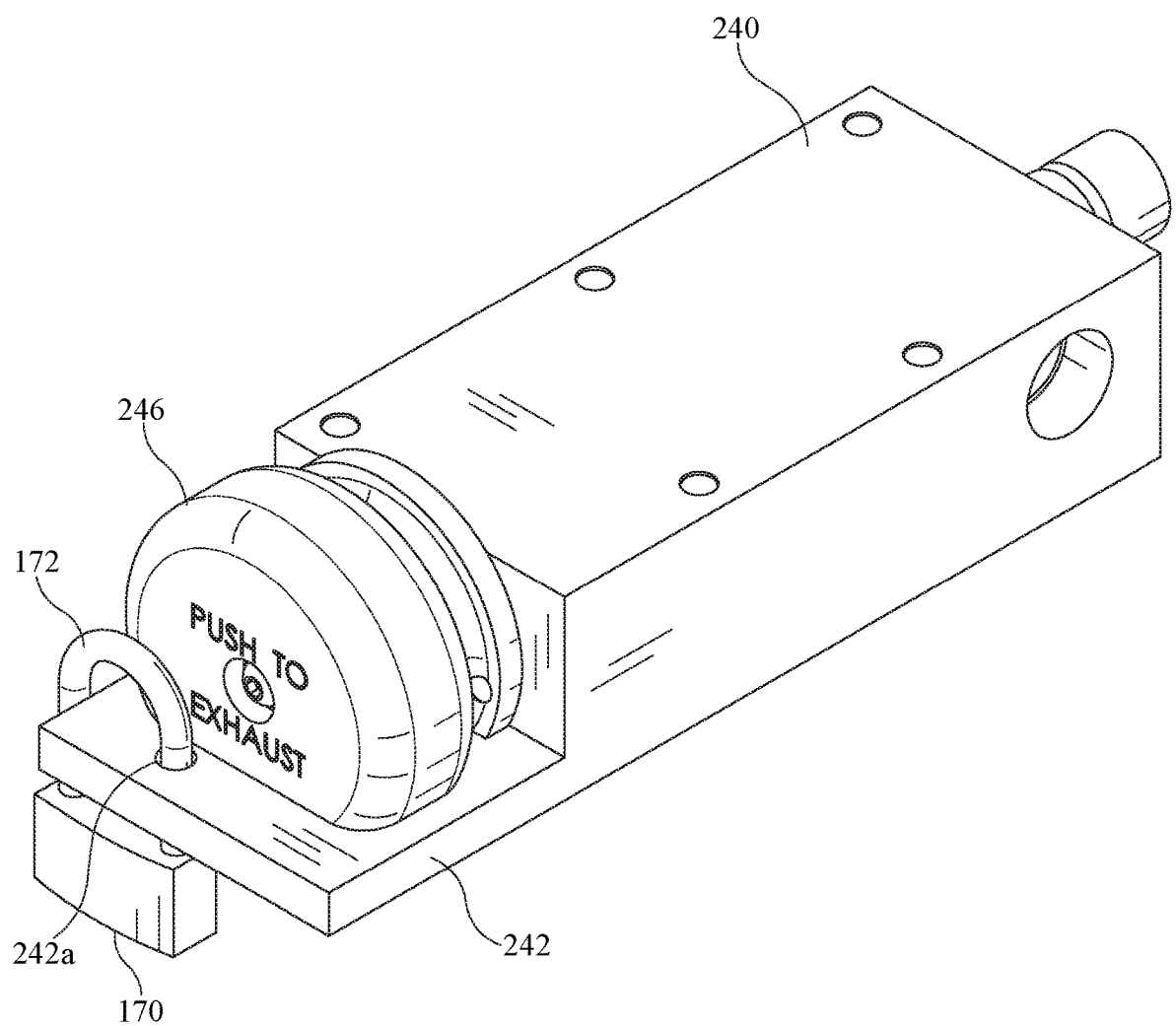
FIG. 6 is a perspective view of an alternate body construction for an exemplary isolation valve for use in a system for exhausting potentially hazardous stored energy from a pneumatic subsystem of a railcar in accordance with the present invention.

FIG. 6 is a perspective view of an alternate body 240 for an exemplary isolation valve made in accordance with the present invention, which operates in the same manner as the isolation valve 130 described above. With respect to application of a "lock-out, tag-out" procedure, the body 240 has a truncated knob construction to allow close engagement with a lower plate 242; specifically, the truncated and substantially flat lower surface of the knob 246 engages the lower plate 242. The shackle 172 of a padlock 170 (or similar lockout device) is inserted through an opening 242a defined through the lower plate 242 adjacent to the knob 246 to bear against the front (or outer) face of the knob 246 when the isolation valve is in the exhaust position, thus locking the isolation valve into the exhaust position.

Figure 7:
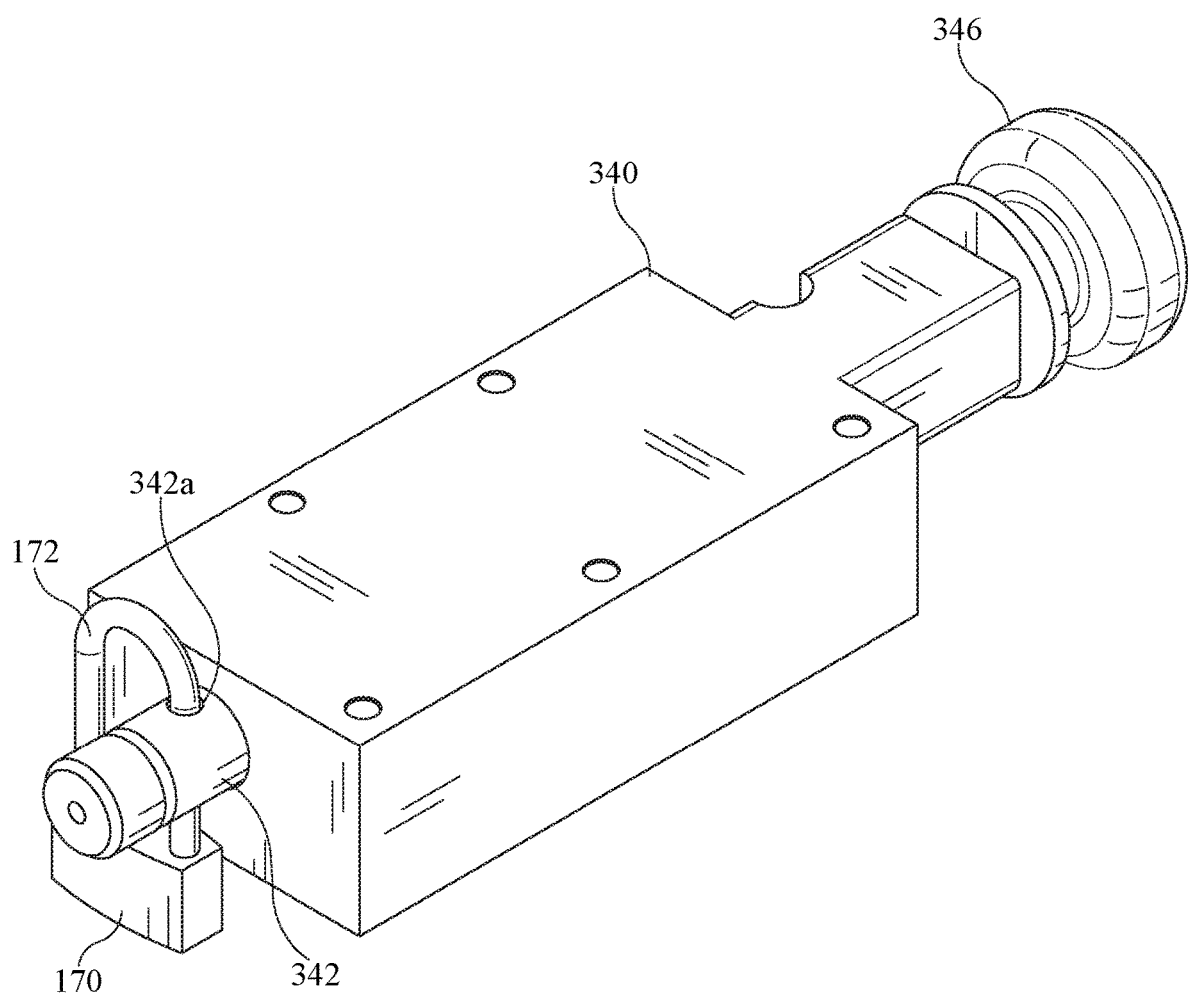
FIG. 7 is a perspective view of an alternate body construction for an exemplary isolation valve for use in a system for exhausting potentially hazardous stored energy from a pneumatic subsystem of a railcar in accordance with the present invention.

FIG. 7 is a perspective view of another alternate body 340 for an exemplary isolation valve made in accordance with the present invention, which operates in the same manner as the isolation valve 130 described above. With respect to application of a "lock-out, tag-out" procedure, a portion of the spool 342 (that is connected to the knob 346) extends through a rear surface of the body 340. The shackle 172 of a padlock 170 (or similar lockout device) is inserted through an opening 342a defined by the spool 342 when the isolation valve is in the exhaust position, thus locking the isolation valve into the exhaust position.

Figure 8:
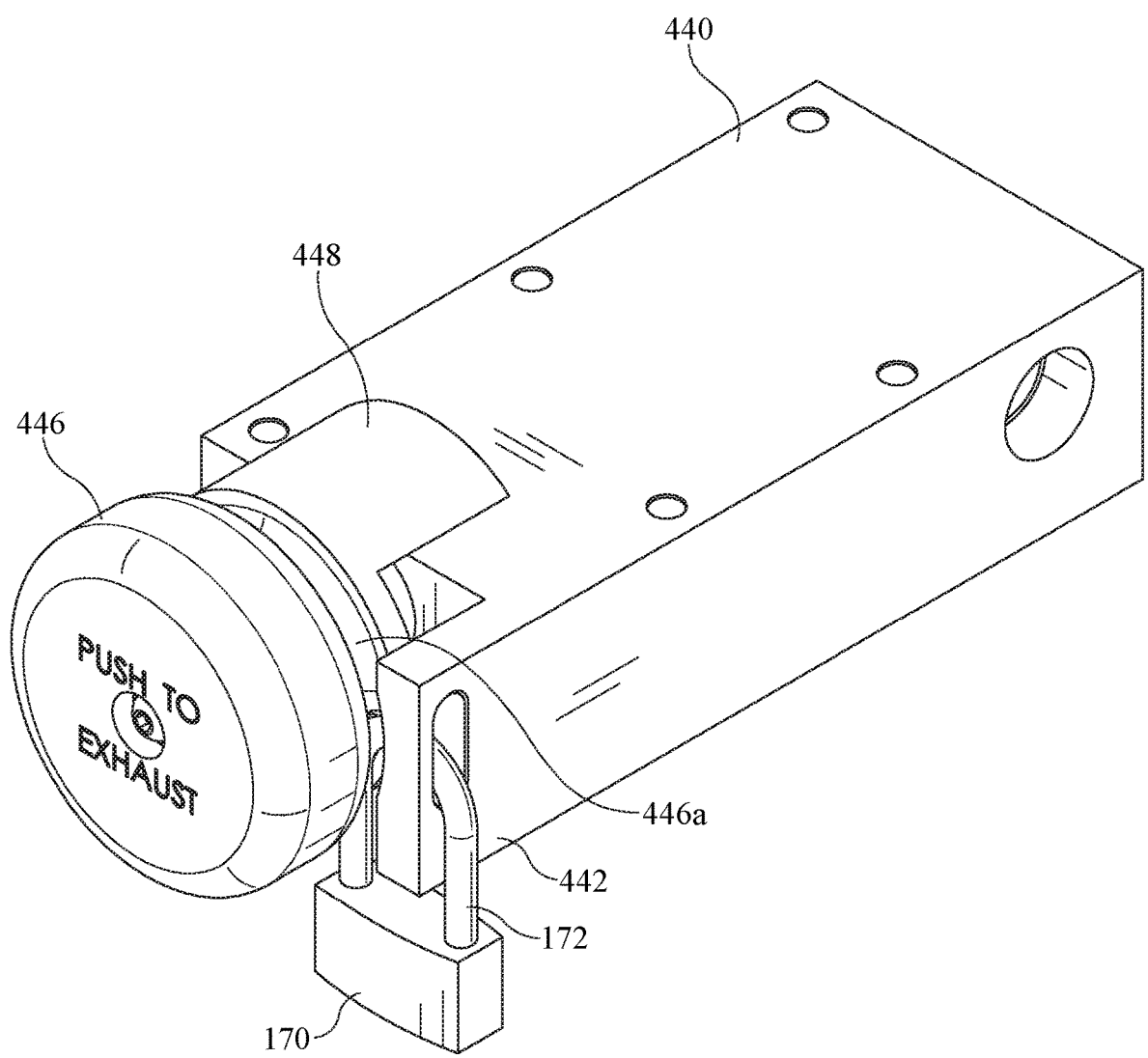
FIG. 8 is a perspective view of an alternate body construction for an exemplary isolation valve for use in a system for exhausting potentially hazardous stored energy from a pneumatic subsystem of a railcar in accordance with the present invention.

FIG. 8 is a perspective view of another alternate body 440 for an exemplary isolation valve made in accordance with the present invention, which operates in the same manner as the isolation valve 130 described above. With respect to application of a "lock-out, tag-out" procedure, the body 440 includes a side plate 442 adjacent to the knob 446 and a hood feature 448 built into the knob 446 that restricts the ability to lock the isolation valve in the normal operating position. At the same time, the shackle 172 of a padlock 170 (or similar lockout device) is inserted through a slot 442a defined in the side plate 442 to engage a groove 446a defined in the external surface of the knob 446 when the isolation valve is in the exhaust position, thus locking the isolation valve into the exhaust position.

Figure 9:
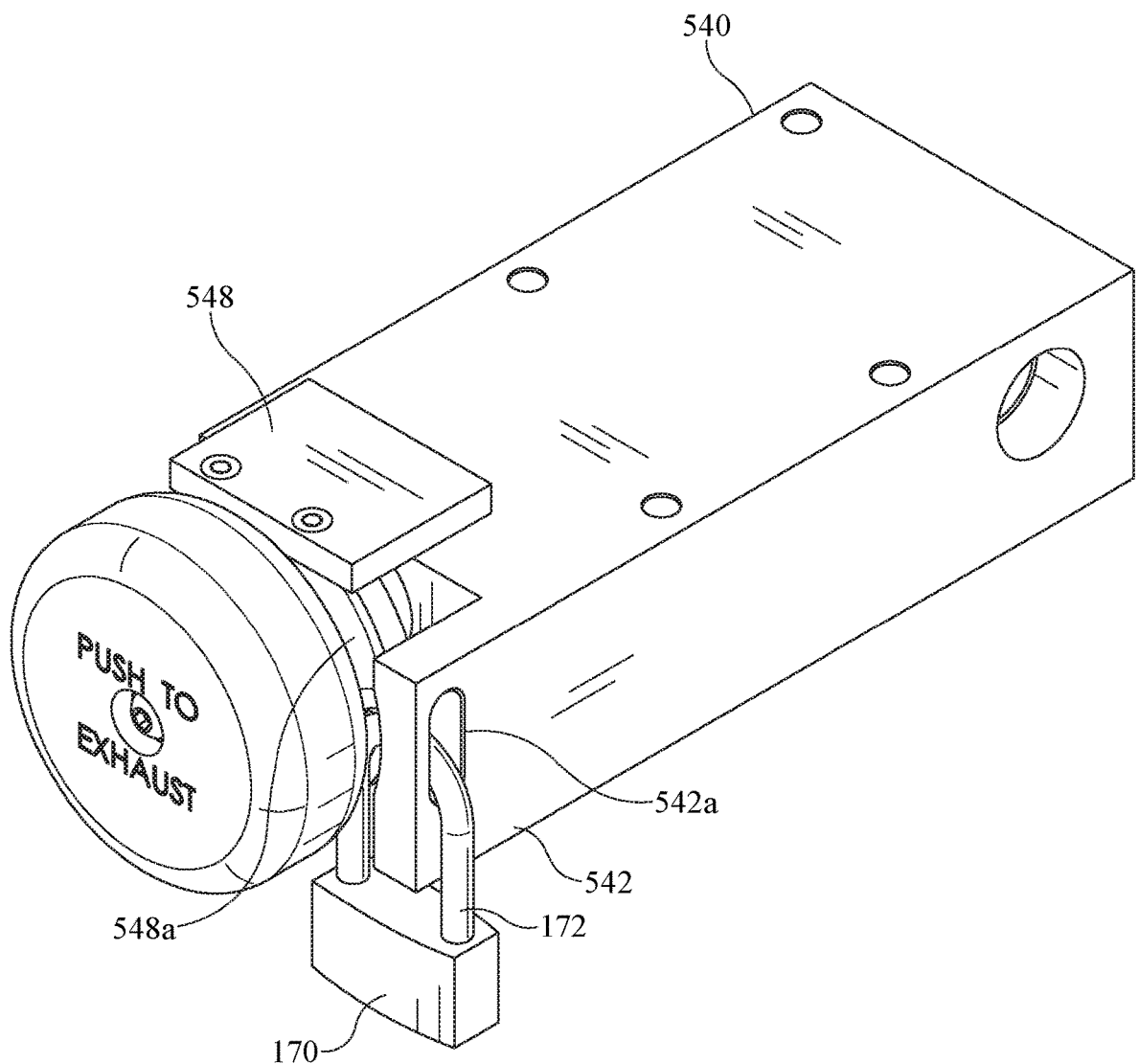
FIG. 9 is a perspective view of an alternate body construction for an exemplary isolation valve for use in a system for exhausting potentially hazardous stored energy from a pneumatic subsystem of a railcar in accordance with the present invention.

FIG. 9 is a perspective view of another alternate body 540 for an exemplary isolation valve made in accordance with the present invention, which operates in the same manner as the isolation valve 130 described above. With respect to application of a "lock-out, tag-out" procedure, the body 540 includes a side plate 542 adjacent to the knob 546. There is also a bolt-on knob hood 548 that restricts the ability to lock the isolation valve in the normal operating position. At the same time, the shackle 172 of a padlock 170 (or similar lockout device) is inserted through a slot 542a defined in the side plate 542 to engage a groove 548a defined in the external surface of the knob 548 when the isolation valve is in the exhaust position, thus locking the isolation valve into the exhaust position.

Figure 10:
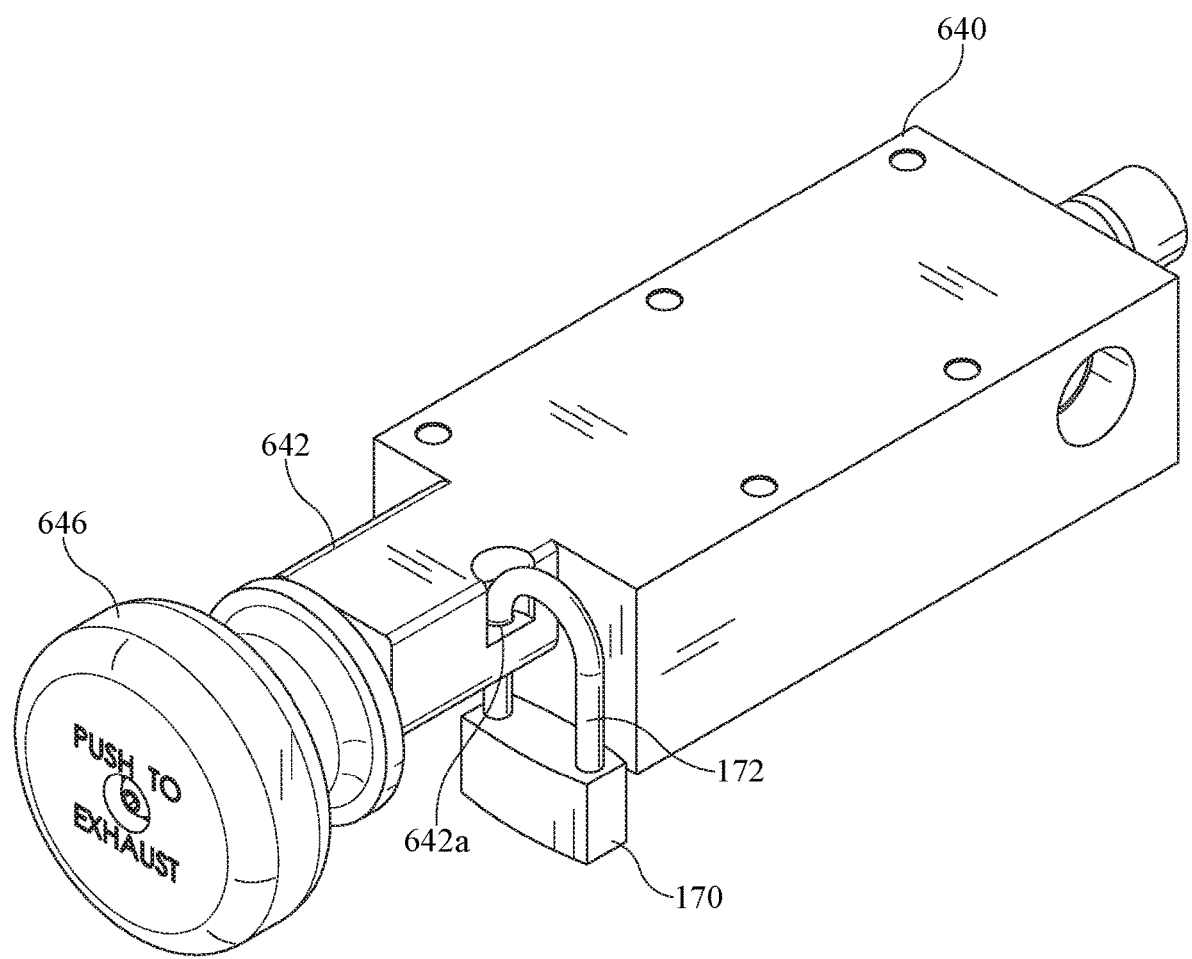
FIG. 10 is a perspective view of an alternate body construction for an exemplary isolation valve for use in a system for exhausting potentially hazardous stored energy from a pneumatic subsystem of a railcar in accordance with the present invention.

FIG. 10 is a perspective view of another alternate body 640 for an exemplary isolation valve made in accordance with the present invention, which operates in the same manner as the isolation valve 130 described above. With respect to application of a "lock-out, tag-out" procedure, the body 640 includes a forward extension 642. When the isolation valve in the exhaust position, the shackle 172 of a padlock 170 (or similar lockout device) is inserted through an opening 642a defined through the forward extension 642 of the body 640 to engage the shaft of the knob 646, thus preventing any further movement of the knob 646 and locking the isolation valve into the exhaust position.

One of ordinary skill in the art will recognize that additional embodiments and implementations are possible without departing from the teachings of the present invention or the scope of the claims which follow. This detailed description, and particularly the specific details of the exemplary embodiments and implementations disclosed herein, is given primarily for clarity of understanding, and no unnecessary limitations are to be understood therefrom, for modifications will become obvious to those skilled in the art upon reading this disclosure and may be made without departing from the spirit or scope of the claimed invention.

What is claimed is:

1. A system for exhausting hazardous stored energy from a pneumatic subsystem of a railcar, comprising:
    an air supply for delivering air to the pneumatic subsystem of the railcar, wherein the pneumatic subsystem is configured to work in conjunction with one or more mechanical linkages to operate one or more doors of the railcar; and
    an isolation valve interposed between the air supply and the pneumatic subsystem of the railcar, wherein the isolation valve includes a body with a sliding shoe positioned in an internal cavity defined by the body and configured for sliding movement with respect to the body between a first position and a second position, wherein the isolation valve also includes a supply port, a delivery port, and an exhaust port, and wherein, when the sliding shoe is in the first position, the supply port and the delivery port are in fluid communication with one another, but when the sliding shoe is in the second position, the sliding shoe effectively closes access to the supply port, and the delivery port and the exhaust port are in fluid communication with one another.

2. The system as recited in claim 1, wherein the isolation valve further includes a knob which extends from the body of the isolation valve and is operably connected to the sliding shoe, such that lateral movement of the knob, which is effectuated via pushing or pulling the knob relative to the body of the isolation valve, effectuates sliding movement of the sliding shoe between the first position and the second position.

3. The system as recited in claim 2, wherein the isolation valve further includes a spool which is positioned in another internal cavity defined by the body and configured for sliding movement with respect to the body, wherein the knob is mounted to a proximal end of the spool, and wherein the sliding shoe is connected to the spool, such that sliding movement of the spool causes corresponding sliding movement of the sliding shoe.

4. The system as recited in claim 1, wherein the sliding shoe of the isolation valve defines a recess in a lower surface thereof, such that, in the second position, the delivery port and the exhaust port are in fluid communication with one another via the recess.

5. The system as recited in claim 1, wherein the isolation valve further includes a means for locking the sliding shoe in the second position.

6. A system for exhausting hazardous stored energy from a pneumatic subsystem of a railcar, comprising:

an air supply for delivering air to the pneumatic subsystem of the railcar, and an isolation valve interposed between the air supply and the pneumatic subsystem of the railcar, (i) wherein the isolation valve includes a body with a sliding shoe positioned in an internal cavity defined by the body and configured for sliding movement with respect to the body between a first position and a second position, (ii) wherein the isolation valve includes a supply port, a delivery port, and an exhaust port, and wherein, when the sliding shoe is in the first position, the supply port and the delivery port are in fluid communication with one another, but when the sliding shoe is in the second position, the sliding shoe effectively closes access to the supply port, and the delivery port and the exhaust port are in fluid communication with one another, (iii) wherein the isolation valve includes a knob which extends from the body of the isolation valve and is operably connected to the sliding shoe, such that lateral movement of the knob effectuates sliding movement of the sliding shoe between the first position and the second position, and (iv) wherein the isolation valve includes a shroud that encircles a shaft of the knob, with aligned upper and lower holes defined through the shroud, such that, when the sliding shoe is in the second position, a groove defined in an external surface of the shaft of the knob is aligned with the upper and lower holes defined through the shroud, such that a lockout device can be inserted into and through the upper and lower holes to engage the groove defined in the external surface of the shaft of the knob to prevent any further movement of the knob.

7. The system as recited in claim 6, wherein the shaft of the knob of the isolation valve includes a first circumferential groove and a second circumferential groove, and wherein a spring-loaded ball is mounted in the shroud and biased into engagement with the shaft of the knob, such that, when the isolation valve is in the first position, the spring-loaded ball is seated in the second circumferential groove.

8. A system for exhausting hazardous stored energy from a pneumatic subsystem of a railcar, comprising:

an air supply for delivering air to the pneumatic subsystem of the railcar, wherein the pneumatic subsystem is configured to work in conjunction with one or more mechanical linkages to operate one or more doors of the railcar; and an isolation valve interposed between the air supply and the pneumatic subsystem, wherein the isolation valve includes a base defining a supply port, a delivery port, and an exhaust port, a body mounted on the base, which defines a first internal cavity and a second internal cavity, a spool positioned in the first internal cavity and configured for sliding movement within the first internal cavity, a knob which extends from the body of the isolation valve and is operably connected to the spool, such that lateral movement of the knob effectuates sliding movement of the spool within the first internal cavity, and a sliding shoe positioned in the second internal cavity and configured for sliding movement within the second internal cavity between a first position and a second position, wherein the sliding shoe is connected to the spool, such that sliding movement of the spool within the first internal cavity causes corresponding sliding movement of the sliding shoe within the second internal cavity between the first position and the second position, and wherein, when the sliding shoe is in the first position, the supply port and the delivery port are in fluid communication with one another, but when the sliding shoe is in the second position, the sliding shoe effectively closes access to the supply port, and the delivery port and the exhaust port are in fluid communication with one another.

9. The system as recited in claim 8, wherein the sliding shoe of the isolation valve defines a recess in a lower surface thereof, such that, in the second position, the delivery port and the exhaust port are in fluid communication with one another via the recess.

10. The system as recited in claim 8, wherein the isolation valve further includes a means for locking the sliding shoe in the second position.

11. A system for exhausting hazardous stored energy from a pneumatic subsystem of a railcar, comprising:

an air supply for delivering air to the pneumatic subsystem of the railcar; and an isolation valve interposed between the air supply and the pneumatic subsystem, wherein the isolation valve includes a base defining a supply port, a delivery port, and an exhaust port, a body mounted on the base, which defines a first internal cavity and a second internal cavity, a spool positioned in the first internal cavity and configured for sliding movement within the first internal cavity, a knob which extends from the body of the isolation valve and is operably connected to the spool, such that lateral movement of the knob effectuates sliding movement of the spool within the first internal cavity, a sliding shoe positioned in the second internal cavity and configured for sliding movement within the second internal cavity between a first position and a second position, and a shroud that encircles a shaft of the knob, with aligned upper and lower holes defined through the shroud, such that, when the sliding shoe is in the second position, a groove defined in an external surface of the shaft of the knob is aligned with the upper and lower holes defined through the shroud, such that a lockout device can be inserted into and through the upper and lower holes to engage the groove defined in the external surface of the shaft of the knob to prevent any further movement of the knob, wherein the sliding shoe is connected to the spool, such that sliding movement of the spool within the first internal cavity causes corresponding sliding movement of the sliding shoe within the second internal cavity between the first position and the second position, and wherein, when the sliding shoe is in the first position, the supply port and the delivery port are in fluid communication with one another, but when the sliding shoe is in the second position, the sliding shoe effectively closes access to the supply port, and the delivery port and the exhaust port are in fluid communication with one another.

12. The system as recited in claim 11, wherein the shaft of the knob of the isolation valve includes a first circumferential groove and a second circumferential groove, and wherein a spring-loaded ball is mounted in the shroud and biased into engagement with the shaft of the knob, such that, when the isolation valve is in the first position, the spring-loaded ball is seated in the second circumferential groove.

13. A method for exhausting hazardous stored energy from a pneumatic subsystem of a railcar, comprising the steps of:
    interposing an isolation valve between an air supply and the pneumatic subsystem of the railcar, wherein the isolation valve includes a body with a sliding shoe positioned in an internal cavity defined by the body and configured for sliding movement with respect to the body between a first position and a second position, wherein the isolation valve also includes a supply port, a delivery port, and an exhaust port, and wherein the isolation valve further includes a knob which extends from the body of the isolation valve and is operably connected to the sliding shoe, such that lateral movement of the knob effectuates sliding movement of the sliding shoe between the first position and the second position; and
    moving, via interaction with the knob, the sliding shoe from the first position, in which the supply port and the delivery port are in fluid communication with one another, to the second position, in which the sliding shoe effectively closes access to the supply port, and the delivery port and the exhaust port are in fluid communication with one another.

14. The method as recited in claim 13, wherein the isolation valve further includes a spool which is positioned in another internal cavity defined by the body and configured for sliding movement with respect to the body, wherein the knob is mounted to a proximal end of the spool, and wherein the sliding shoe is connected to the spool, such that sliding movement of the spool causes corresponding sliding movement of the sliding shoe.

15. The method as recited in claim 13, wherein the isolation valve further includes:
    a shroud that encircles a shaft of the knob, with aligned upper and lower holes defined through the shroud, such that, when the sliding shoe is in the second position, a groove defined in an external surface of the shaft of the knob is aligned with the upper and lower holes defined through the shroud, such that a lockout device can be inserted into and through the upper and lower holes to engage the groove defined in the external surface of the shaft of the knob to prevent any further movement of the knob.

16. The method as recited in claim 15, wherein the shaft of the knob of the isolation valve includes a first circumferential groove and a second circumferential groove, and wherein a spring-loaded ball is mounted in the shroud and biased into engagement with the shaft of the knob, such that, when the isolation valve is in the first position, the spring-loaded ball is seated in the second circumferential groove.

17. A method for exhausting hazardous stored energy from a pneumatic subsystem of a railcar, comprising the steps of:
    interposing an isolation valve between an air supply and the pneumatic subsystem of the railcar, wherein the isolation valve includes a body with a sliding shoe positioned in an internal cavity defined by the body and configured for sliding movement with respect to the body between a first position and a second position, and wherein the isolation valve also includes a supply port, a delivery port, and an exhaust port; and
    moving the sliding shoe from the first position, in which the supply port and the delivery port are in fluid communication with one another, to the second position, in which the sliding shoe effectively closes access to the supply port, and the delivery port and the exhaust port are in fluid communication with one another;
    wherein the sliding shoe of the isolation valve defines a recess in a lower surface thereof, such that, in the second position, the delivery port and the exhaust port are in fluid communication with one another via the recess.

18. A method for exhausting hazardous stored energy from a pneumatic subsystem of a railcar, which is configured to work in conjunction with one or more mechanical linkages to operate one or more doors of the railcar, comprising the steps of:
    interposing an isolation valve between an air supply and the pneumatic subsystem of the railcar, wherein the isolation valve includes a body with a sliding shoe positioned in an internal cavity defined by the body and configured for sliding movement with respect to the body between a first position and a second position, and wherein the isolation valve also includes a supply port, a delivery port, and an exhaust port;
    moving the sliding shoe from the first position, in which the supply port and the delivery port are in fluid communication with one another, to the second position, in which the sliding shoe effectively closes access to the supply port, and the delivery port and the exhaust port are in fluid communication with one another; and
    locking the sliding shoe in the second position.

\* \* \* \* \*